(12) United States Patent
Stahl et al.

(10) Patent No.: US 9,084,177 B2
(45) Date of Patent: Jul. 14, 2015

(54) ADAPTIVE TIME ALLOCATION IN A TDMA MAC LAYER

(75) Inventors: Thomas Anthony Stahl, Indianapolis, IN (US); Qingjiang Tian, West Lafayette, IN (US); Robert Andrew Rhodes, Carmel, IN (US)

(73) Assignee: THOMSON LICENSING, Boulogne-Billancourt (FR)

( * ) Notice: Subject to any disclaimer, the term of this patent is extended or adjusted under 35 U.S.C. 154(b) by 1029 days.

(21) Appl. No.: 12/312,768

(22) PCT Filed: Dec. 13, 2006

(86) PCT No.: PCT/US2006/047583
§ 371 (c)(1),
(2), (4) Date: May 26, 2009

(87) PCT Pub. No.: WO2008/073089
PCT Pub. Date: Jun. 19, 2008

(65) Prior Publication Data
US 2010/0054215 A1    Mar. 4, 2010

(51) Int. Cl.
*H04W 48/16* (2009.01)
*H04W 72/04* (2009.01)
(Continued)

(52) U.S. Cl.
CPC .............. *H04W 48/08* (2013.01); *H04W 28/14* (2013.01); *H04W 48/16* (2013.01); *H04W 72/0406* (2013.01); *H04W 72/1273* (2013.01)

(58) Field of Classification Search
CPC ............ H04W 48/16; H04W 72/0406; H04W 72/1273; H04W 48/08
See application file for complete search history.

(56) References Cited

U.S. PATENT DOCUMENTS

| 7,137,138 B2 | 11/2006 | Shibata |
| 7,417,996 B2 | 8/2008 | Hong et al. |

(Continued)

FOREIGN PATENT DOCUMENTS

| CN | 1640026 | 7/2005 |
| CN | 1677929 | 10/2005 |

(Continued)

OTHER PUBLICATIONS

IEEE Standard Nos. 11-12, pp. 111-113, 138-142, 188-193, Wireless Medium Access Control (MAC) and Physical Layer (PHY) Specifications for High Rate Wireless Personal Area Networks, IEEE STD 802.15.3, 2003.

(Continued)

*Primary Examiner* — Jianye Wu
(74) *Attorney, Agent, or Firm* — Robert D. Shedd; Jerome G. Schaefer

(57) ABSTRACT

A method and apparatus for wirelessly re-distributing multi-media streams, including receiving multi-media streams at a master device from a source, adaptively determining channel time allocations in response to status information for transmit queues and transmission channel conditions, constructing a superframe from said multi-media streams for insertion into said downstream channel time allocations and wireless transmitting the channel time allocations to effect re-distribution of said multi-media streams to a remote device, are described. Also described is a method for wirelessly receiving re-distributed a multi-media stream including receiving a beacon signal and a channel time allocation and receiving said re-distributed multi-media stream.

30 Claims, 16 Drawing Sheets

(51) Int. Cl.
*H04W 72/12* (2009.01)
*H04W 48/08* (2009.01)
*H04W 28/14* (2009.01)

(56) References Cited

U.S. PATENT DOCUMENTS

| | | | |
|---|---|---|---|
| 7,599,689 B2 | 10/2009 | Makipaa et al. | |
| 2002/0057709 A1* | 5/2002 | Edmon et al. | 370/442 |
| 2002/0064273 A1* | 5/2002 | Tomikawa et al. | 379/221.02 |
| 2002/0159544 A1* | 10/2002 | Karaoguz | 375/329 |
| 2003/0065809 A1* | 4/2003 | Byron | 709/232 |
| 2006/0050689 A1* | 3/2006 | Rabenko et al. | 370/356 |
| 2007/0291777 A1* | 12/2007 | Jamieson et al. | 370/401 |

FOREIGN PATENT DOCUMENTS

| | | |
|---|---|---|
| EP | 1484867 A2 | 12/2004 |
| JP | 51005914 A | 1/1976 |
| JP | 59023652 A | 2/1984 |
| JP | 63228832 A | 9/1988 |
| JP | 2002111615 | 4/2002 |
| JP | 2004364257 A | 12/2004 |
| JP | 2005318619 A | 11/2005 |
| JP | 2006505147 A | 2/2006 |
| KR | 100666127 | 1/2007 |
| KR | 100678894 | 2/2007 |
| WO | WO03047176 | 6/2003 |
| WO | 03063434 A2 | 7/2003 |
| WO | 2005041488 A1 | 5/2005 |
| WO | WO2006004283 | 1/2006 |
| WO | WO2006049415 | 5/2006 |

OTHER PUBLICATIONS

Liu et al., "Scheduling Algorithms Analysis for MPEG-4 Traffic in UWB," Dept. of Automation, Tsinghua University, Beijing, China, 2004 IEEE, pp. 5310-5314.
International Search Report, dated Aug. 29, 2007.

* cited by examiner

ADAPTIVE TIME ALLOCATION IN A TDMA MAC LAYER

This application claims the benefit, under 35 U.S.C. §365 of International Application PCT/US2006/047,583, filed 13 Dec. 2006, which was published in accordance with PCT Article 21(2) on 19 Jun. 2008, in English. Additionally, the disclosure of this application is closely related to disclosed subject matter included in International Application PCT/US2006/047,842 filed 15 Dec. 2005 which was published in accordance with PCT Article 21 (2) on 19 Jun. 2008 in English. Furthermore, the disclosure of this application is closely related to disclosed subject matter included in International Application PCT/US2006/048,619, filed 20 Dec. 2006, and which is commonly assigned and incorporated by reference in its entirety.

FIELD OF THE INVENTION

The present invention relates to distribution of compressed multi-media/video from a master device such as set top box (STB) to remote devices such as STBs in a wireless video server system.

BACKGROUND OF THE INVENTION

For cable video services, specific video programs are typically broadcast on the cable in their own dedicated frequency band. Any TV in the house can be tuned to any specific program by tuning to that frequency. In the case of newer TV services (e.g., satellite TV distribution, internet TV distribution), programs are "tuned" in a master STB and are then distributed to remote STBs over a home network. In many cases, a home network (or home distribution system) needs to be installed. Although wires (coax, twisted pair, etc.) are reliable, they can be expensive to install and homeowners may not like installers drilling through walls for the installation. With that in mind, the industry is interested in wireless solutions to the video program redistribution system problem.

Most existing in-home video distribution systems use Ethernet as the distribution media. Since most Ethernet installations use at least 100 Mbps link rates and use switches, which selectively transmit traffic only to the branch containing the addressed device, there are very few QoS issues when used in a video redistribution system with controlled traffic rates. There could be problems with Ethernet if one transmitted general IP data traffic on the same network without some type of QoS protection. There is currently one type of MAC level QoS available for Ethernet. It is a priority based scheme, which uses the user priority field in the virtual local area network (VLAN) tag. The addition of parameterized QoS (bandwidth request, bandwidth guarantee, admission control, etc.) is currently the subject of one of the working groups within the IEEE 802.1 subcommittee on IEEE 802 network bridging. However, Ethernet has the disadvantage that it requires wires to be run and it is desirable to have a no-new-wires installation technology for video program redistribution.

What is needed is a wireless distribution system that can replace the Ethernet distribution through MAC-level bridging. Many home networks distribute the video using IP protocols, but there are many other possibilities. In some cases video is sent using UDP as specified by real time transport protocol (RTP), while in other cases (e.g., Digital Living Network Alliance (DLNA)) video is distributed over TCP. UDP requires only one way communication while TCP requires two-way communication. There are additional possibilities. It would be desirable to have a home distribution system that does not require any modifications to the master and remote devices/STBs when they already have an Ethernet interface (i.e., no bandwidth reservation, no talking to the wireless bridge devices, etc.). It is also desirable that the MAC layer be extremely efficient since the media is wireless and therefore a band-limited common media. For that reason, the present invention uses a TDMA MAC scheme. But in a TDMA MAC scheme, time slots must be assigned resulting in dedicated bandwidth to each client/remote device (STB). But the exact bit rates of the video and other characteristics may not be known, even to the master STB a-priori. Even if the exact bit rates of the video were known a-priori, it is desirable not to require the master STB have any special or new communication with the wireless devices (remote STBs). Therefore, it is desirable to have a home distribution system that adapts to the type of MAC-level traffic currently being distributed.

IEEE 802.11N, which is currently under standardization in the IEEE is being touted as a means for video distribution. There are a number of concerns with the technology that is the subject of IEEE 802.11N. First, it still is based on CSMA (IEEE 802.11). This type of MAC layer is inherently inefficient and provides no QoS guarantees. Although many MAC-level QoS enhancements are being added to IEEE 802.11N, it is unlikely that a CSMA based MAC can be as efficient as a TDMA MAC. QoS enhancements include the priority based QoS from IEEE 802.11E and some form of polling. These enhancements can be very useful in managing the resources of an IEEE 802.11 network, but do not make any QoS guarantees that are necessary or desirable for wireless home video distribution systems. The polling could be used to create TDMA-like services on which the present invention could operate, but the polling itself cuts into the MAC efficiency. MAC efficiency is even more critical for a wireless network because of the limited link rate available to the more remote areas of a house. Most current Wireless LANs utilize a common transmission media (i.e., wireless spectrum at the same transmission frequency). Because of that, the MAC needs a mechanism for sharing that media.

Some service providers are looking at no-new-wire technologies based on coax, phone lines, and/or power lines. There are many different possibilities, most of the possibilities have some form of priority or parameterized QoS. The problems inherent with these solutions are that even though there may be coax or phone lines already in a house, those lines still may not be wired to the right spot or may be a topology that is difficult for the technology to handle. Most of these technologies also share bandwidth with other houses (e.g., power lines for up to 4 houses are on one power transformer) and currently lack reliability. For the parameterized service, the STB must know how much bandwidth to reserve for each link. For a video home distribution system, the traffic is not under control, may be bursty, and is at least partially unknown.

The present invention encompasses a home multi-media stream distribution system that solves the problems highlighted above.

SUMMARY OF THE INVENTION

Most current Wireless LANs utilize a common transmission media (i.e., wireless spectrum at the same transmission frequency). Because of that, the media access control (MAC) layer needs a mechanism for sharing that media. Most mechanisms are based on a carrier sense multiple access (CSMA) MAC layer (e.g., IEEE 802.11). This type of MAC layer is inherently inefficient and provides no quality of service (QoS) guarantees. MAC efficiency is even more critical for a wireless network because of the limited link rate available to the more remote areas of a house. To achieve a very high efficiency and QoS guarantees, the present invention uses a MAC based on time division multiple access (TDMA). For basic TDMA functionality, a standard MAC is used but the ability to adapt to data traffic patterns without changing the application or middleware software is added.

A typical system for which the present invention is designed includes a master device that distributes internet protocol (IP) based video to up to three client/remote devices. The devices are Ethernet/Wireless MAC-level bridge devices with the actual video tuning and rendering being done in Ethernet based STBs. While the present invention is described in terms of STBs, any device with equivalent or like functionality is contemplated by the present invention regardless of the name for that device. In general, a MAC bridge connects LAN segments that could be the same or different. A collection of different LAN technologies that are interconnected by bridges is known as a bridge local area network. A MAC bridge operates below the MAC services boundary and is transparent to the protocols used above the MAC bridge services boundary, except for possibly differences in QoS.

The system and method of the present invention will be described in terms of an exemplary home video distribution system with restricted communication to three remote STBs (i.e., all communication to/from the master STB). The techniques described herein can easily be extended to a more general home network. It should be noted that to date, there are no wireless home distributions systems that can distribute three high-definition video streams to three remote locations in the house. It should be noted that while the present invention is described in terms of an exemplary embodiment that includes video streaming, it should be readily apparent that the term "video" can be extended to include "multi-media stream" which includes other streaming media such as digital audio.

All traffic is restricted to go to/from the master bridging device. The master bridging device transmits a beacon periodically that maps out the channel time allocations (CTAs) within which each device transmits it's data. The beacon plus all of the CTAs up to the next beacon is called a "superframe" as illustrated in FIG. 8. CTA 1, 2, & 3 are for downstream traffic (mostly video). CTA 4, 5, & 6 are for upstream traffic (mostly TCP acknowledgments (ACKs) and other management/control frames). The master bridging device determines the CTA allocations prior to beacon transmission. In general, the CTAs could be fixed time slots either determined by the master device (master STB) or requested by the remote device (remote STBs). However, whatever CTA time is requested or set, none of the devices really know all of the IP traffic characteristics a-priori. The traffic could be based on user datagram protocol (UDP) (no returning ACKs) or could be based on transmission control protocol (TCP). At times, all of the traffic could be downstream (asymmetric) while at other times, it could be somewhat symmetric. It is desirable to make full use of all available time allocations/slots.

In accordance with an aspect of the present invention, a master bridging device sets the CTA times in an adaptive way. The master bridging device receives information regarding the status of all transmit queues (one for each CTA). The status information includes a minimum set of such things as number of packets in the queue, average length of packets in the queue, and packet queue arrival rate. The service rate for each transmit queue is proportional to the length of the corresponding CTA. CTAs are restricted in that they must add up to the length of the superframe, which most usually occurs at a periodic rate. Thus, in the present invention, the master STB allocates more time to queues that are fuller and/or have a higher input arrival rate. Many different adaptive algorithms are possible depending on the exact criteria used. In the present invention, the mean queue level is estimated using conventional techniques. Combining those expressions (i.e., performance criteria associated with each CTA, in this case mean queue levels) into an overall metric, such as sum, mean squared error, etc. Adaptive processing techniques are then used to allocate CTAs in such a way that the allocation operates around the minimum of the metric, which is optimal in some sense. The system of the present invention has the advantage that it can adapt quickly to allocate CTAs in such a way as to maximize throughput for any given steady state traffic pattern, but can then quickly adapt to a new pattern within several superframes. It also has the advantage that these optimal allocations are determined based on traffic patterns. It is assumed that there is no control over the traffic patterns and that there is not enough information to "reserve" a fixed amount of bandwidth (BW) for each device. The present invention also has the advantage that it does not require any change to the application level (in this case: video system middlewire, including the protocols carrying the video).

A method and apparatus for wirelessly re-distributing multi-media streams, including receiving multi-media streams at a master device from a source, adaptively determining channel time allocations in response to status information for transmit queues and transmission channel conditions, constructing a superframe from said multi-media streams for insertion into said downstream channel time allocations and wireless transmitting the channel time allocations to effect re-distribution of said multi-media

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1:
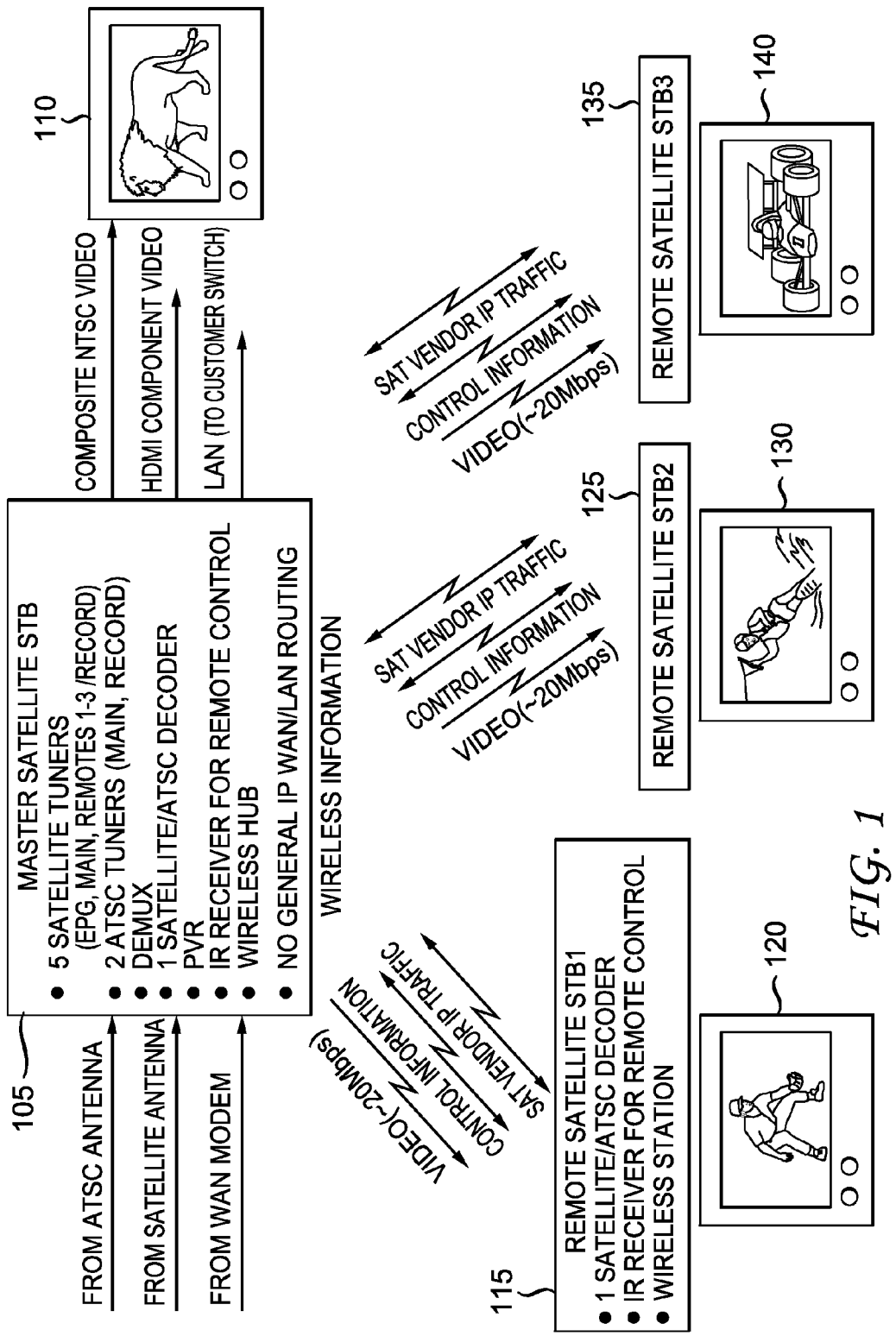
FIG. 1 is an exemplary wireless home video distribution system in accordance with the principles of the present invention.

The present invention starts with an IEEE 802.15.3B MAC, which supports TDMA services (beacon at beginning of the superframe with transmission time allocations within the superframe). Although other TDMA MACs are available and can be used (e.g., IEEE 802.16), there have been no attempts in the prior art to allocate CTA lengths dynamically purely based on traffic characteristics available to the MAC layer.

There are some features of TCP that must be considered when setting up CTAs. TCP is a transport protocol that makes use of 32 bit sequence numbers and request numbers and a 16 bit sliding window length field. These three numbers are used to implement a "Stop-and-Wait" or "Go-Back-N" ARQ error recovery scheme. Since TCP packets in the transmit queue and in the process of being transmitted are "in the network," the TCP window must be set large enough by the destination to allow those packets to be outstanding. The present invention has no control over setting the size of that window, however the initial choice of CTAs and superframe length can be chosen short enough to minimize problems. The length of the superframe may be made adjustable (or adaptable) to be able to handle varying TCP window sizes.

For a 10 msec superframe, approximately nineteen 1400 byte TCP packets are transmitted every 10 msec. This accounts for 26,600 bytes. A transmit buffer queue of approximately 165 kbytes has been chosen for purposes of the following description of the exemplary embodiment. For TCP traffic, the transmit buffer queue will never overflow because the TCP window size will not allow more than 64 kbytes of outstanding data. It is even possible that the window may be small enough to not even allow a CTA to be completely filled. For this reason, it is better to start off with a short superframe (5 msec). The transmit buffer queue then need not be bigger than 51 kbytes, at least to be able to handle a single TCP session. However, the 165 kbyte transmit buffer queue was chosen for the exemplary embodiment to avoid lost packets in the case of video sent over UDP.

Note that, mathematical models of ARQ error recovery schemes have been developed within the field of queueing theory and can be used to model the TCP performance more precisely if needed. It is assumed that the window size is large enough to allow enough outstanding TCP packets for some to be in the queue while others are in the CTA. In the exemplary embodiment up to five retransmissions are permitted, the CTA should be small enough that about five times the data can be sitting in the transmit buffer queue. A 5 msec superframe would accomplish this if a maximum size TCP window were used.

While the initial application will be streaming video using TCP, there is enough flexibility in the implementation that to guarantee good performance in the general sense the method is allowed to adapt to the traffic pattern.

Real-time length-flexible superframe construction is possible, which is believed to increase system robustness and improve system performance. The length of the superframe may depend on the length of three individual video queues in the exemplary embodiment, downstream transmission channel condition, and any other possible issues. In the case of a length-flexible superframe, the beacon must broadcast the length of the following CTAs and each remote STB is informed about the length of the CTAs dedicated to it.

As noted above, it is possible that if the TCP receive window is small enough with respect to the length of the CTA, that the server will not release the next packet until receiving an ACK from a previous packet, effectively slowing down the stream at the source. The rate could fall below the desired real-time streaming rate. To avoid this, the present invention selects CTA size that does not result in this starved condition. To maintain the proper rate, the CTA needs to occur more often if it is reduced in size. This occurs by reducing the size of the superframe or by allocating more than one CTA to that link per superframe.

As further noted above, the uncertainty on the TCP window size leads to the possibility of varying the superframe length. This can be done at the MAC layer by triggering a superframe change based on looking at the TCP header or more properly by monitoring the transmit buffer queues and shortening the superframe if the transmit buffer queues empty too often leaving the CTA short of data to transmit. Initially a fixed superframe length was used in the exemplary embodiment. Given a fixed superframe length, modifying CTA lengths to adapt to traffic characteristics is investigated. In that case, there is some uncertainty of how much time to allocate to those CTAs mostly meant for TCP ACKs, since TCP may group ACKs and/or may include the ACK in the header of a packet containing data.

At a bare minimum, it is known the average output packet rate of any given transmit queue must be kept below the average packet arrival rate, otherwise, the queue will overflow. However, even with the average arrival rate being less than the average departure rate, it is possible for the input rate to temporarily exceed the output rate due to the statistical nature of the input stream. Keeping the average output rate higher than the average input rate is necessary, but not sufficient. It is best to make the system adaptive due to the lack of specificity of the IP traffic.

To allow for adaptation, queue information for every superframe is recorded. Queue information includes the size of queue (if fixed, no need to send), the number of packets in queue, the average length of packets in queue, and an estimate of the input packet rate. This information along with information on reliable link rates to each DEV or remote STB is used as input to an adaptive algorithm whose goal is to not drop packets and to distribute the superframe time to CTAs in a way that reaches that goal. The use of a "/" herein denotes alternate names for the same components. The adaptation algorithms strive to minimize the expected number of packets in each queue (and hence minimize delay) and/or minimize the probability that a queue overflows. By monitoring the queue level, the MAC may adjust the CTAs every superframe to give transmit preference to the queue that is most full.

The present invention concerns the MAC and bridging layers of a wireless video service distribution system, which distributes compressed video from a master STB to remote STBs. The system makes partial use of an IEEE 802.15.3b TDMA MAC and therefore uses some of the terminology from that standard. An exemplary system with the technology built into the STBs is shown in FIG. 1.

The master STB 105 receives input from a variety of sources of video including an Advanced Television Systems Committee (ATSC) antenna (digital TV), a satellite antenna and a wide area network (WAN) modem. The master STB provides output to a video display 110 (for example, TV) including a composite National Television Standards Committee (NTSC) video display, High Definition Multi-media Interface (HDMI) component video display and a local area network (LAN) connected to a customer switch. The master STB has 5 satellite tuners (electronic program guide (EPG), main, three remote tuners and a recording tuner). The main tuner is for tuning to the program that the user of the display in communication with the master STB desires. The three remote tuners are for tuning to the programs that each of the users of the remote displays desire. The EPG tuner is for tuning to the electronic program guide. The recording tuner is to tune to a program that the user of the display in communication with the master STB wants to record while be/she is watching the program tuned to by the main satellite tuner. The master STB has two ATSC tuners—a main tuner and a recording tuner. The main tuner is for tuning to the program that the user of the display in communication with the master STB desires. The recording tuner is to tune to a program that the user of the display in communication with the master STB wants to record while he/she is watching the program tuned to by the main ATSC tuner. The master STB also has a demultiplexer (demux), a personal video recorder (PVR), an infrared (IR) receiver for use with a remote control device, a satellite/ATSC decoder and a wireless hub. Master STB 105 can transmit video to each remote STB at about 20 Mbps. Master STB 105 can exchange satellite vendor IP traffic with each remote STB. Master STB 105 can exchange control information with each remote STB.

The master STB is in communication with three remotes STBs (remote STB1 115, remote STB2 125 and remote STB3 135). Remote STB1 115 is in communication with a video display 120. Remote STB2 125 is in communication with a video display 130. Remote STB3 135 is in communication with a video display 140. The remotes STBs are similarly configured so only remote STB1 will be described. Remote STB1 115 has a satellite/ATSC decoder, an IR receiver for use with a remote control device and a wireless station. Remotes STB1 115 can receive video from master STB 105 at about 20 Mbps. Remote STB1 can exchange satellite vendor IP traffic between itself and master STB 105. Remote STB1 115 can exchange control information with master STB 105.

Figure 2:
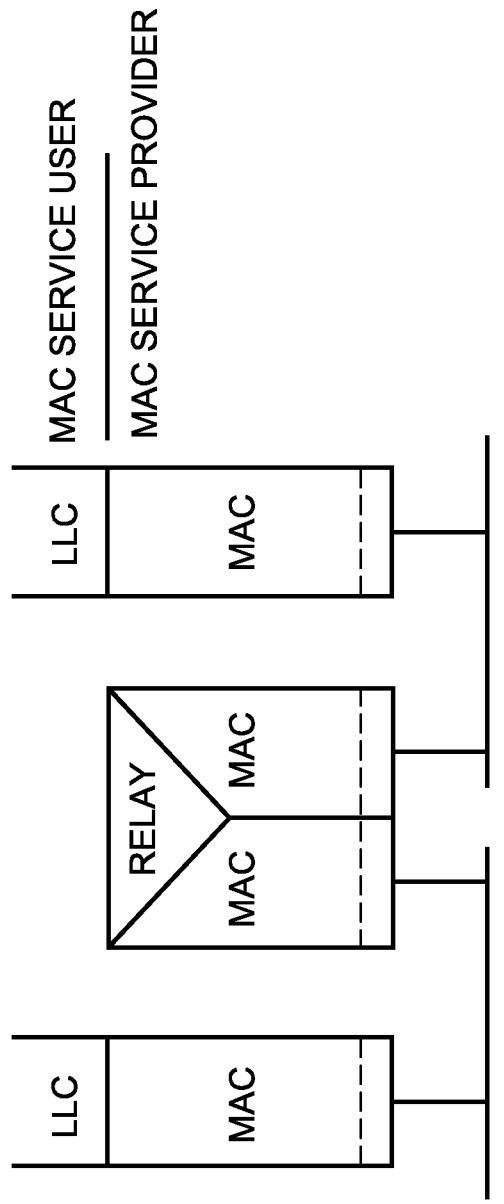
FIG. 2 is a MAC-level bridge.

The present invention is built as a MAC-level wireless bridge (see FIG. 2). In general, a MAC bridge connects LAN segments that could be the same or different. A collection of different LAN technologies that are interconnected by bridges is known as a bridge local area network. A MAC bridge operates below the MAC services boundary and is transparent to the protocols used above the MAC bridge services boundary, except for possibly differences in QoS. The MAC services user is above the MAC services boundary and the MAC services provider is below the MAC service boundary. The MAC layer bridge includes a relay to interface with each LAN segment/component.

Figure 3:
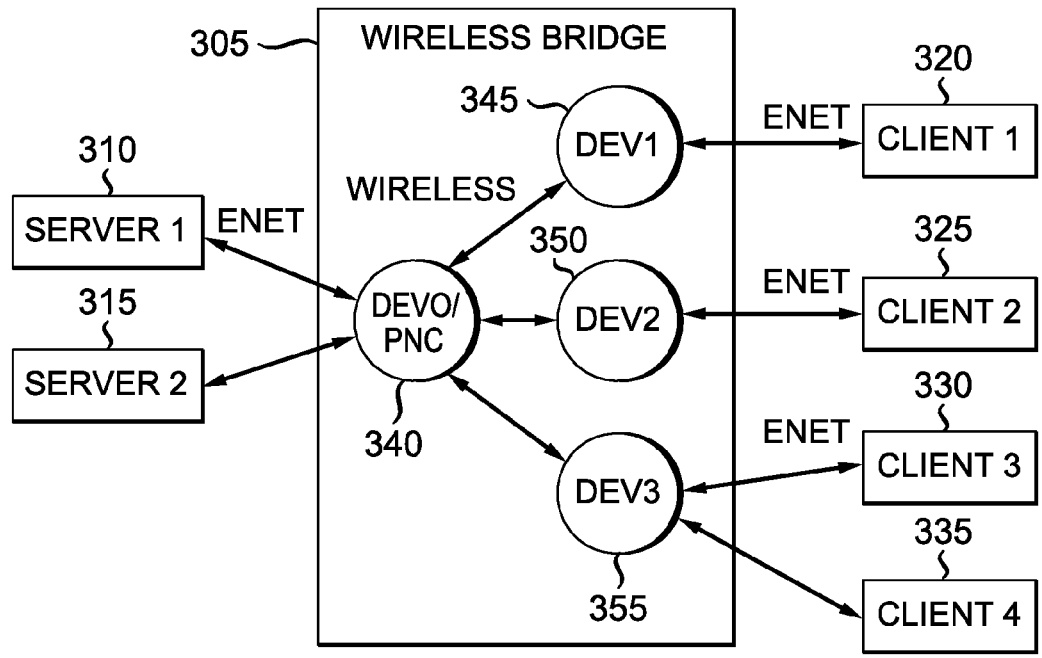
FIG. 3 is a general wireless bridge.

A general wireless bridge is shown in FIG. 3. Wireless bridge 305 is in communication with servers via Ethernet connections. Two servers 310, 315 are shown. Wireless bridge 305 is also in communication with clients via Ethernet connections. Four clients 320, 325, 330, 335 are shown. Within the general wireless bridge is DEV0, which is a piconet controller (PNC) 340. PNC 340 is in communication with a plurality of devices wirelessly. Three devices DEV1 345, DEV2 350 and DEV3 355 are shown. DEV0/PNC 340 is in communication with server 310, 315. DEV1 345 is in communications with client 320. DEV2 350 is in communication with client 325. DEV3 355 is in communication with clients 330, 335.

Figure 4:
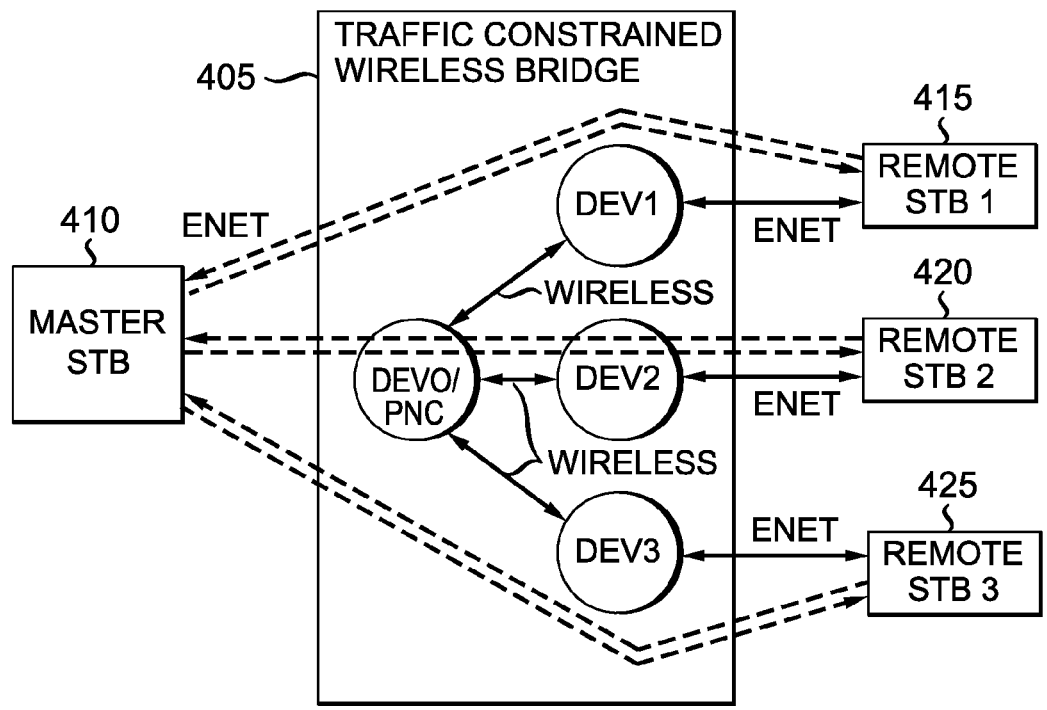
FIG. 4 is a wireless bridge having constrained paths suitable for wireless home video distribution in an exemplary embodiment of the present invention.

The exemplary embodiment of the present invention, however, has constrained paths suited for a wireless home video service distribution application. Possible data paths are shown by dashed lines in FIG. 4. Wireless bridge 405 is in communication with master STB 410 wirelessly. Wireless bridge 405 is also in communication with remote STBs 415, 420, 125 wirelessly. Wireless bridge 405 internally is configured as shown in FIG. 2. All traffic goes to/from master STB 410.

Figure 5:
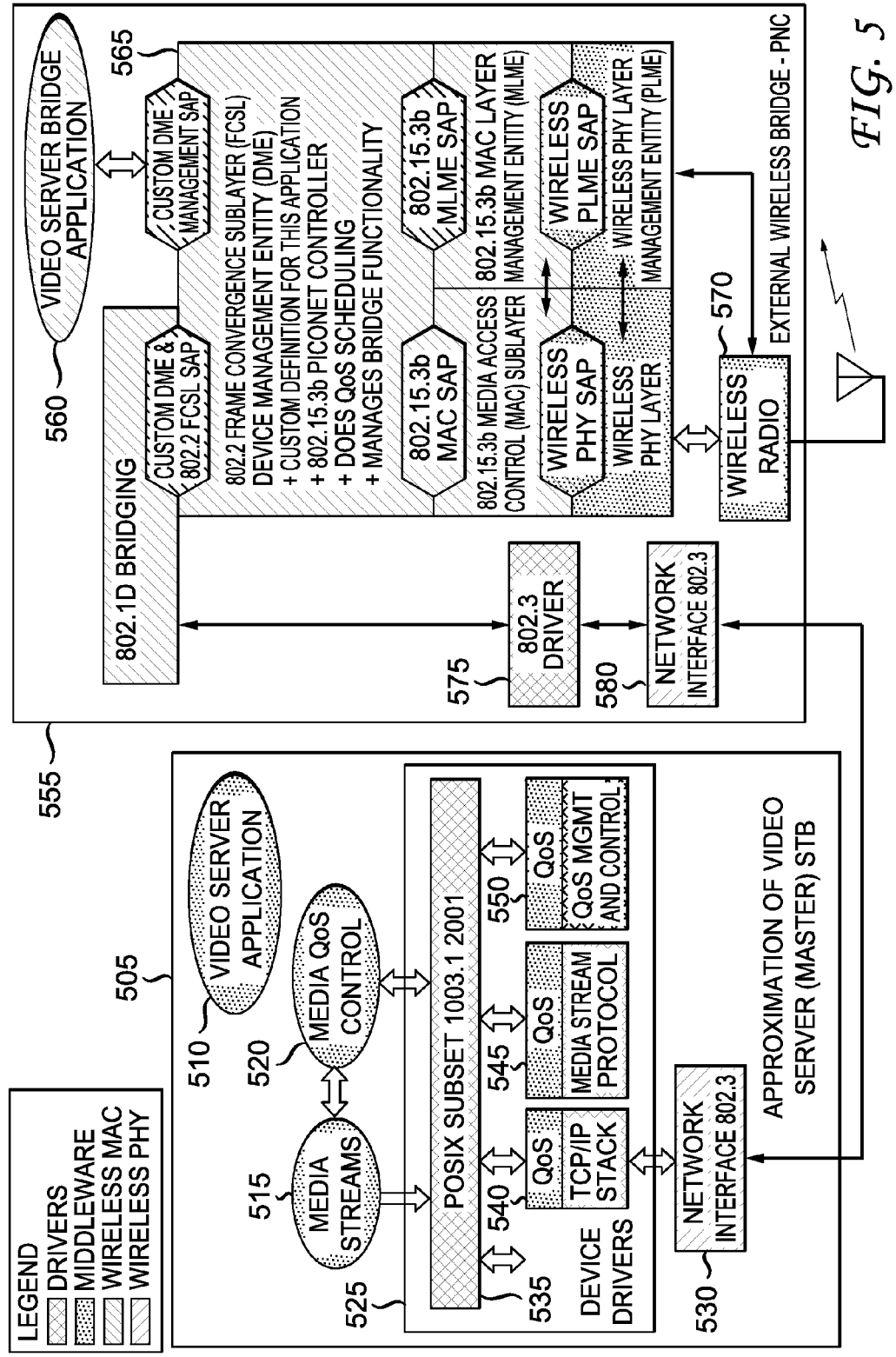
FIG. 5 is a block diagram of the software (logical structure) of the master STB and the server side of the wireless MAC bridge.

FIG. 5 shows the software architecture of the server side (master STB and bridge device). It is noted that the master bridge device is also the piconet controller (PNC) as described in IEEE 802.15.3. The master STB 505 has a middleware video server application 510 in the master STB 505. Multi-media stream middleware 515 interfaces with both media QoS control 520 and device drivers 525. Multi-media stream middleware 515 forwards video data to device drivers 525 and exchanges control information with Media QoS control middleware 520. Media QoS control middleware exchanges control information with device drivers 525. Device drivers 525 exchange primarily video data with network interface (IEEE 802.3) 530. Within device drivers 525 are a subset of portable operating system Unix (POSIX) drivers 535 for receiving video data and control information from media stream middleware 515 and exchanging information with media QoS control middleware 520. The subset of POSIX drivers exchange information with QoS middleware that is in a stack with TCP/IP 540 and media stream protocol 545 and QoS management and control 550. The PNC 555 has a wireless MAC video server bridge application 560, which exchanges control information with software 565, which includes a plurality of software modules. Software 565 exchanges video data and control information with wireless radio interface 570 and with IEEE 802.3 driver 575. IEEE 802.3 driver exchanges primarily video data with IEEE 802.3 network interface 580, which interfaces and exchanges that video information with IEEE 802.3 network interface 530. Software 565 includes a number of software components including an IEEE 802.1D bridging module, which is layered on a wireless device management entity (DME) and IEEE 802.2 frame convergence sublayer (FCSL) service access point (SAP). Wireless MAC video server bridge application 560 interfaces with wireless DME management SAP. Both wireless DME management SAP and wireless DME and IEEE 802.2 FCSL SAP are layered over the IEEE 802.2 FCSL DME, which performs the functions of an IEEE 802.15.3b PNC, does QoS scheduling and manages bridge functionality. The IEEE 802.2 FCSL DME is layered over an IEEE 802.15.3b MAC SAP and an IEEE 802.13.3b MAC layer management entity (MLME) SAP. The IEEE 802.13.3b MAC layer management entity (MLME) SAP is layered over an IEEE 802.15.3b MLME, which is layered over the wireless physical layer management entity (PLME) SAP. The IEEE 802.15.3b MAC SAP is layered over the IEEE 802.15.3b MAC sublayer, which is layered over the wireless physical SAP. The IEEE 802.15.3b MAC SAP is layered over the wireless physical layer. The wireless physical layer management entity (PLME) SAP is layered over the wireless physical layer PLME. The wireless PLME is in communication with the wireless physical layer. The IEEE 802.15.3b MAC sublayer is in (communication with the IEEE 802.15.3b MLME. Both the wireless physical layer and the wireless PLME exchange video data and control information respectively with the wireless radio interface. It is software 565 and 560 that adaptively determine CTAs, transmit a beacon signal and downstream packets within downstream CTAs and receive MAC-level ACKs/NAKs that the redistributed video/media has been received.

Figure 6:
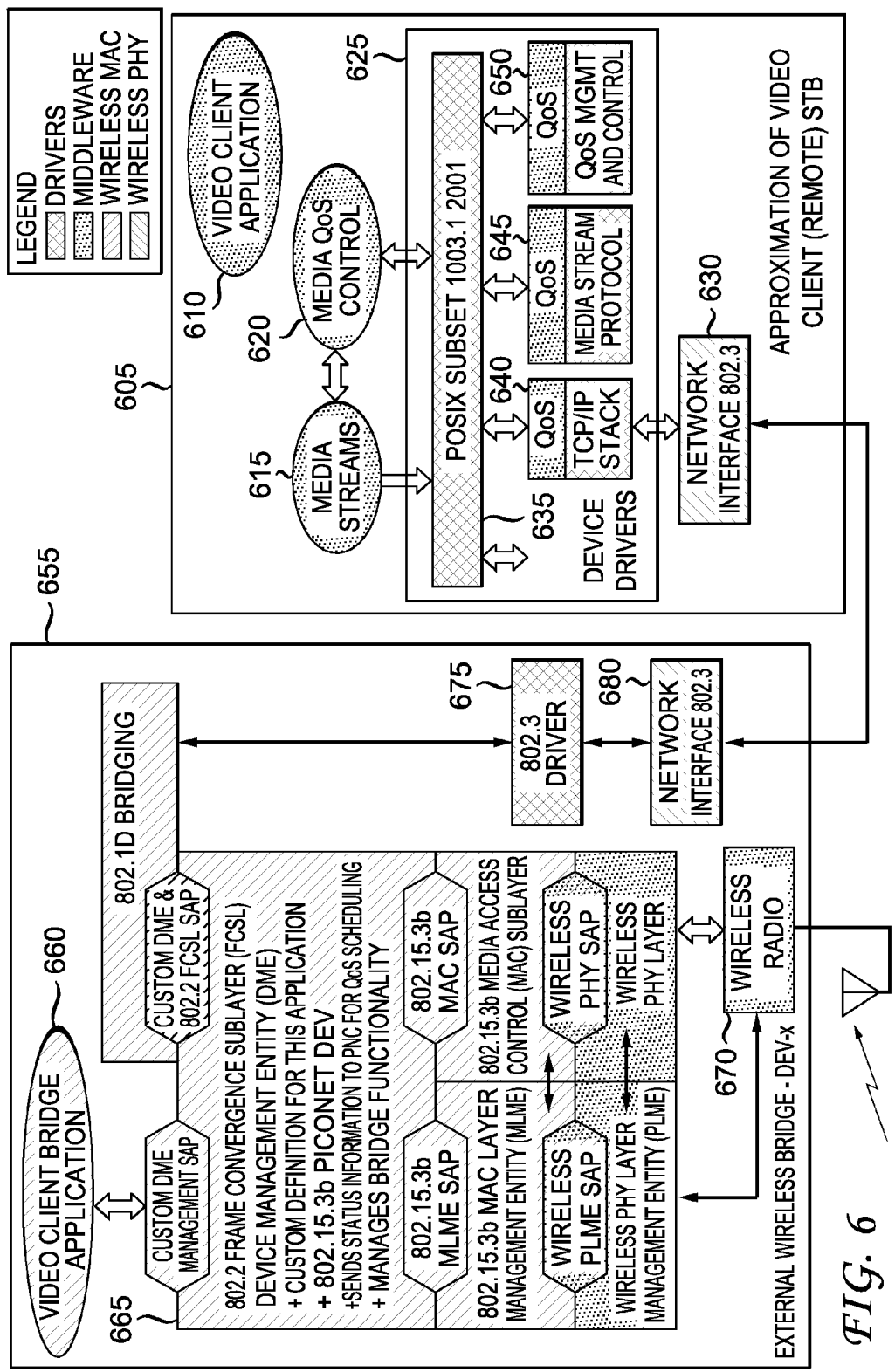
FIG. 6 is a block diagram of the software (logical structure) of the remote/client STB and the client side of the wireless MAC bridge.

FIG. 6 shows the SW architecture for the client side (Remote STB and Bridge Device). Note that the present invention is in the bridge devices, but the STBs are shown for context. It is noted that the remote/client bridge device is also a DEV-x (non-PNC device) as described in IEEE 802.15.3. The remote/client STB 605 has a middleware video client application 610 in the remote/client STB 605. Media stream middleware 615 interfaces with both media QoS control 620 and device drivers 625. Media stream middleware 615 accepts video data from device drivers 625 and exchanges control information with Media QoS control middleware 620. Media QoS control middleware exchanges control information with device drivers. Device drivers 625 exchange mostly video data with network interface (IEEE 802.3) 630. Within device drivers 625 are a subset of POSIX drivers 635 for sending primarily video data to media stream middleware 615 and exchanging information with media QoS control middleware 620. The subset of POSIX drivers exchange information with QoS middleware that is in a stack with TCP/IP 640 and media stream protocol 545 and QoS management and control 650. The DEV-x 655 has a wireless MAC video client bridge application 660, which exchanges video data and control information with software 665, which includes a plurality of software modules. Software 665 exchanges video data and control information with wireless radio interface 670 and with IEEE 802.3 driver 675. IEEE 802.3 driver exchanges primarily video data with IEEE 802.3 network interface 680, which interfaces and exchanges that video data with IEEE 802.3 network interface 630. Software 665 includes a number of software components including an IEEE 802.1D bridging module, which is layered on a wireless DME and IEEE802.2 FCSL SAP. Wireless MAC video client bridge application 660 interfaces with wireless DME management SAP. Both wireless DME management SAP and wireless DME and IEEE 802.2 FCSL SAP are layered over the IEEE 802.2 FCSL DME, which performs the functions of an IEEE 802.15.3b DEV-x, sends status to the PNC for QoS scheduling and manages bridge functionality. The IEEE 802.2 FCSL DME is layered over an IEEE 802.15.3b MAC SAP and an IEEE 802.13.3b MLME SAP. The IEEE 802.13.3b MLME SAP is layered over an IEEE 802.15.3b MLME, which is layered over the wireless physical layer management entity (PLME) SAP. The IEEE 802.15.3b MAC SAP is layered over the IEEE 802.15.3b MAC sublayer, which is layered over the wireless physical SAP. The IEEE 802.15.3b MAC SAP is layered over the wireless physical layer. The wireless PLME SAP is layered over the wireless physical layer PLME. The wireless PLME is in communication with the wireless physical layer. The IEEE 802.15.3b MAC sublayer is in communication with the IEEE 802.15.3b MLME. Both the wireless physical layer aid the wireless PLME exchange video data and control information with the wireless radio interface. It is software 665 and 660 that receive a beacon signal with information on CTAs, receive the redistributed video/media within those downstream CTAs and transmit MAC-level ACKs or NAKs in the appropriate upstream CTA. Note that these ACKs are different than TCP ACKs that may be generated at the Video Client if TCP is used.

Figure 7:
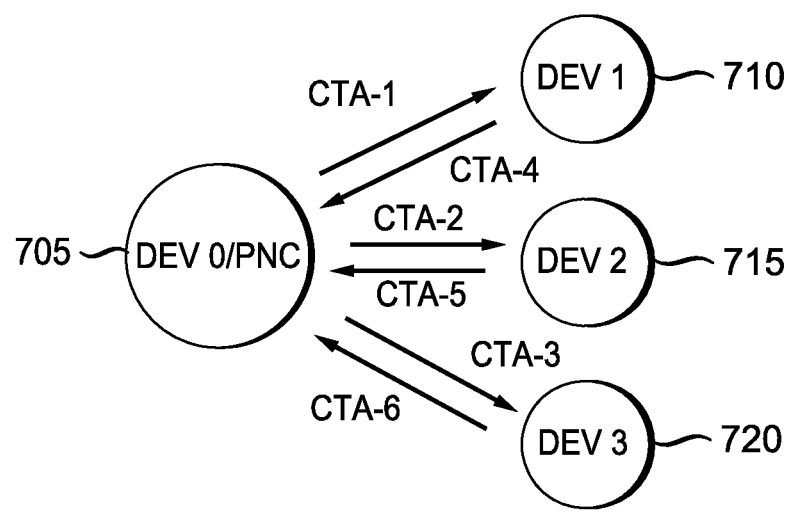
FIG. 7 is a block diagram of a wireless high definition MAC bridge showing how CTAs are used in accordance with the principles of the present invention.

Referring now to FIG. 7, which is a block diagram of a wireless MAC bridge in accordance with the principles of the present invention. PNC 705 transmits and receives data/information to/from the remote STBs 710, 715, 720 in the assigned CTAs. The master device 705 transmits a beacon periodically that maps out the channel time allocations (CTAs) within which each device transmits it's data CTA 1, 2, & 3 are for downstream traffic (mostly video). CTA 4, 5, & 6 are for upstream traffic (mostly TCP ACKs and other management frames).

Figure 8:
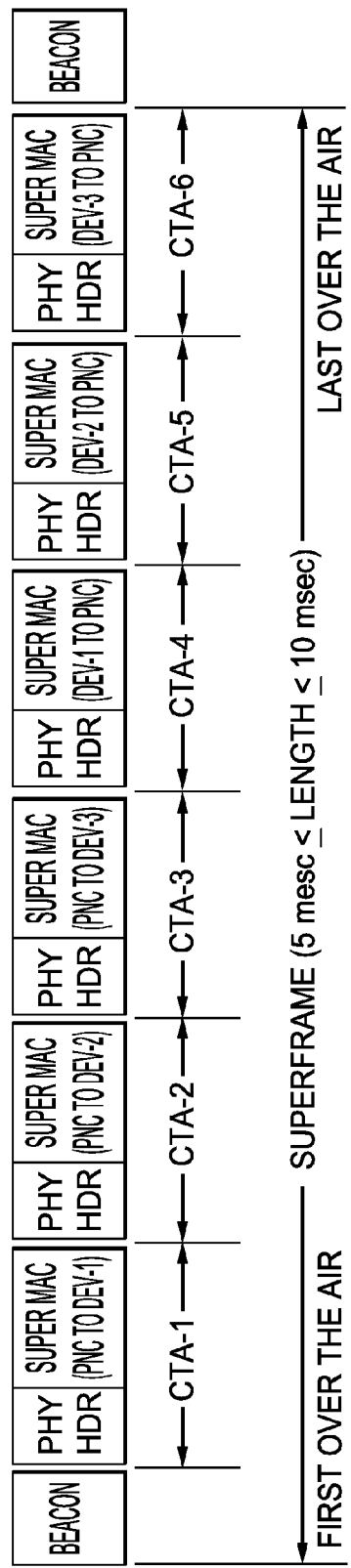
FIG. 8 depicts a superframe in accordance with the present invention.

Superframe is shown in FIG. 8. The master device determines the CTAs prior to beacon transmission. In general, the CTAs could be fixed time slots either determined by the master device/PNC or requested by a remote device/STB. Specifically, for IEEE 802.15.3b, the standard specifies the remote STBs/devices to request bandwidth by sending a "CTReq" message to the PNC. However, whatever CTA time is requested or set, none of the devices really knows all of the IP traffic characteristics a-priori, especially the remote STBs. The traffic could be based on UDP (no returning ACKs) or could be based on TCP. At times, all of the traffic could be downstream while at other times, it could be somewhat symmetric. It is desirable to make fill use of all available time by adapting the amount of time within CTAs to optimize traffic flow. The leftmost portion of the superframe is transmitted over the air first and the rightmost portion of the superframe is transmitted over the air last. Following the beacon, the CTAs are transmitted in order with the downstream CTAs being transmitted first and the upstream CTAs being transmitted thereafter. Superframes in the context of the present invention can vary between 5 msec and 10 msec.

Figure 9:
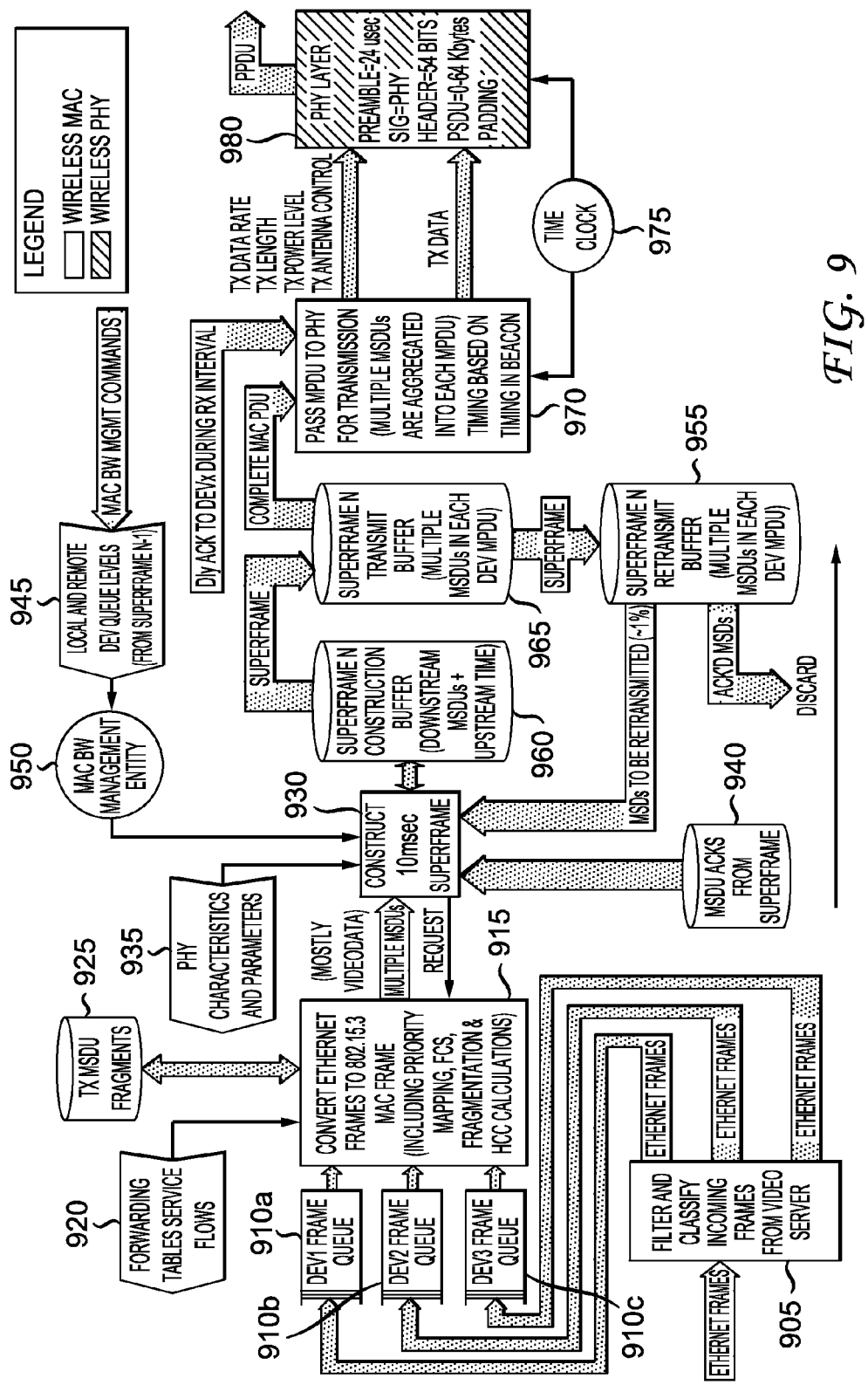
FIG. 9 is a high level transmit packet flow diagram for the PNC connected to the video server (master STB).
Figure 10:
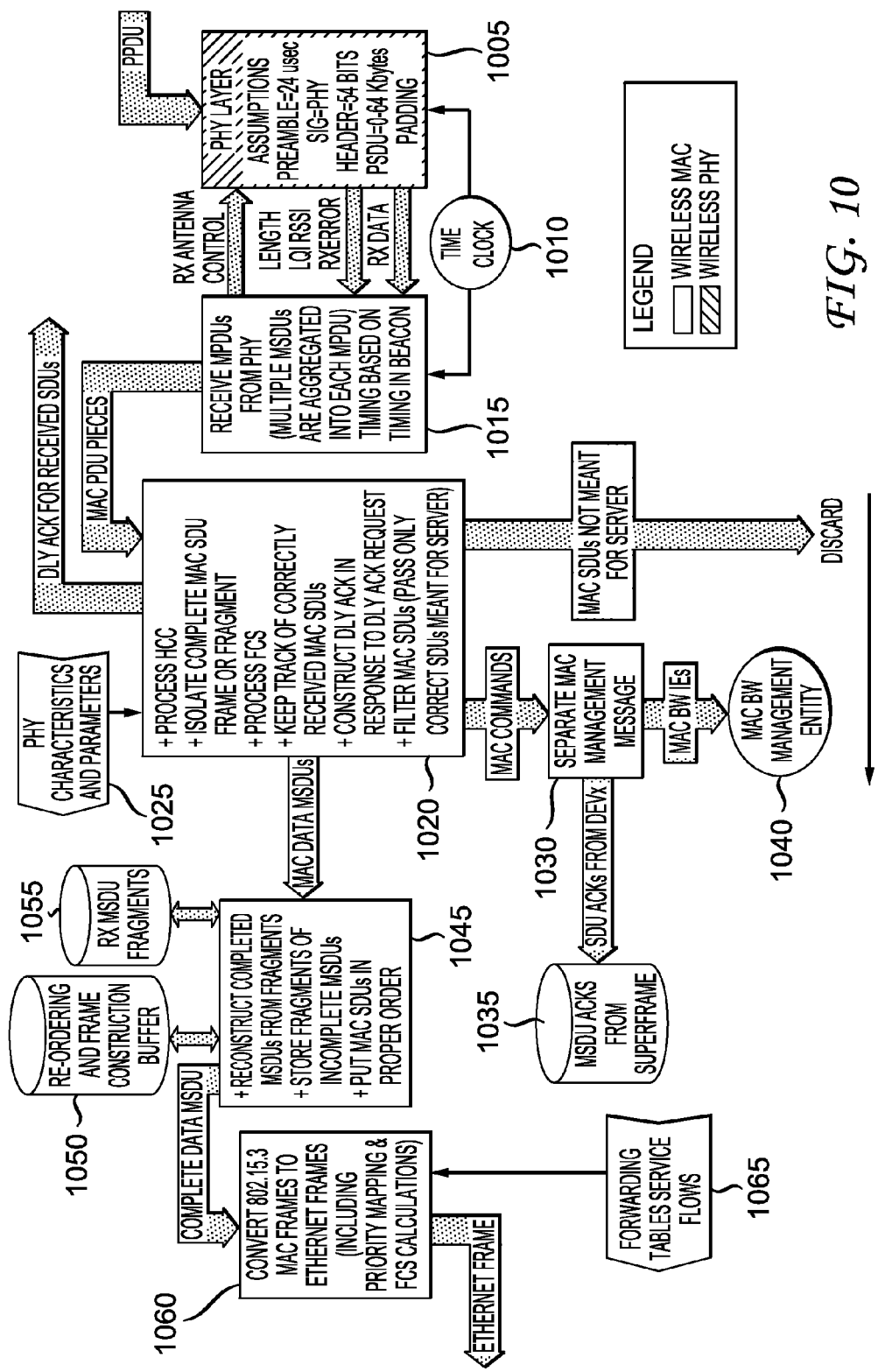
FIG. 10 is a high level receive packet flow diagram for the PNC connected to the video server (master STB).
Figure 11:
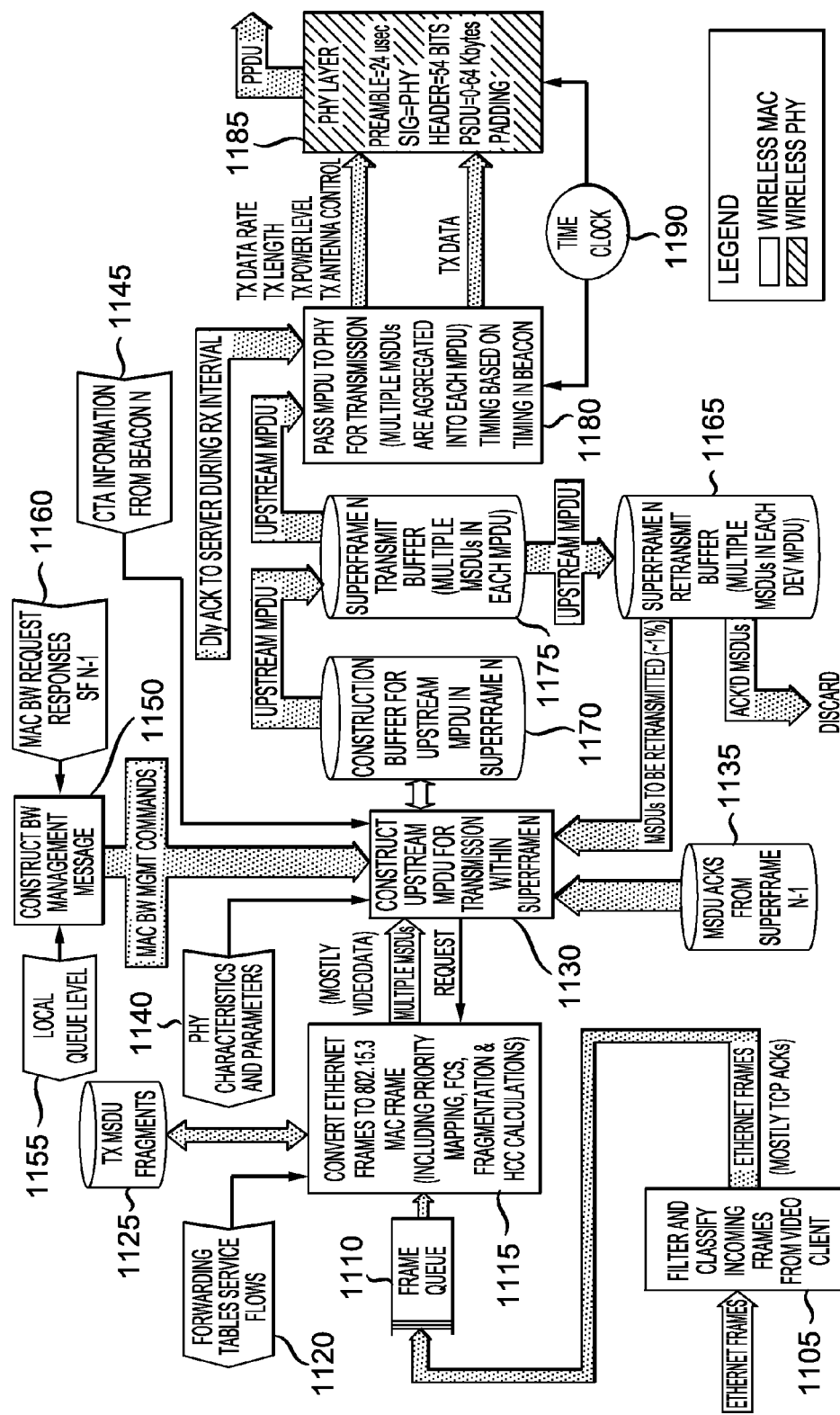
FIG. 11 is high level transmit packet flow diagram for the DEV-x connected to a video client (remote STB).
Figure 12:
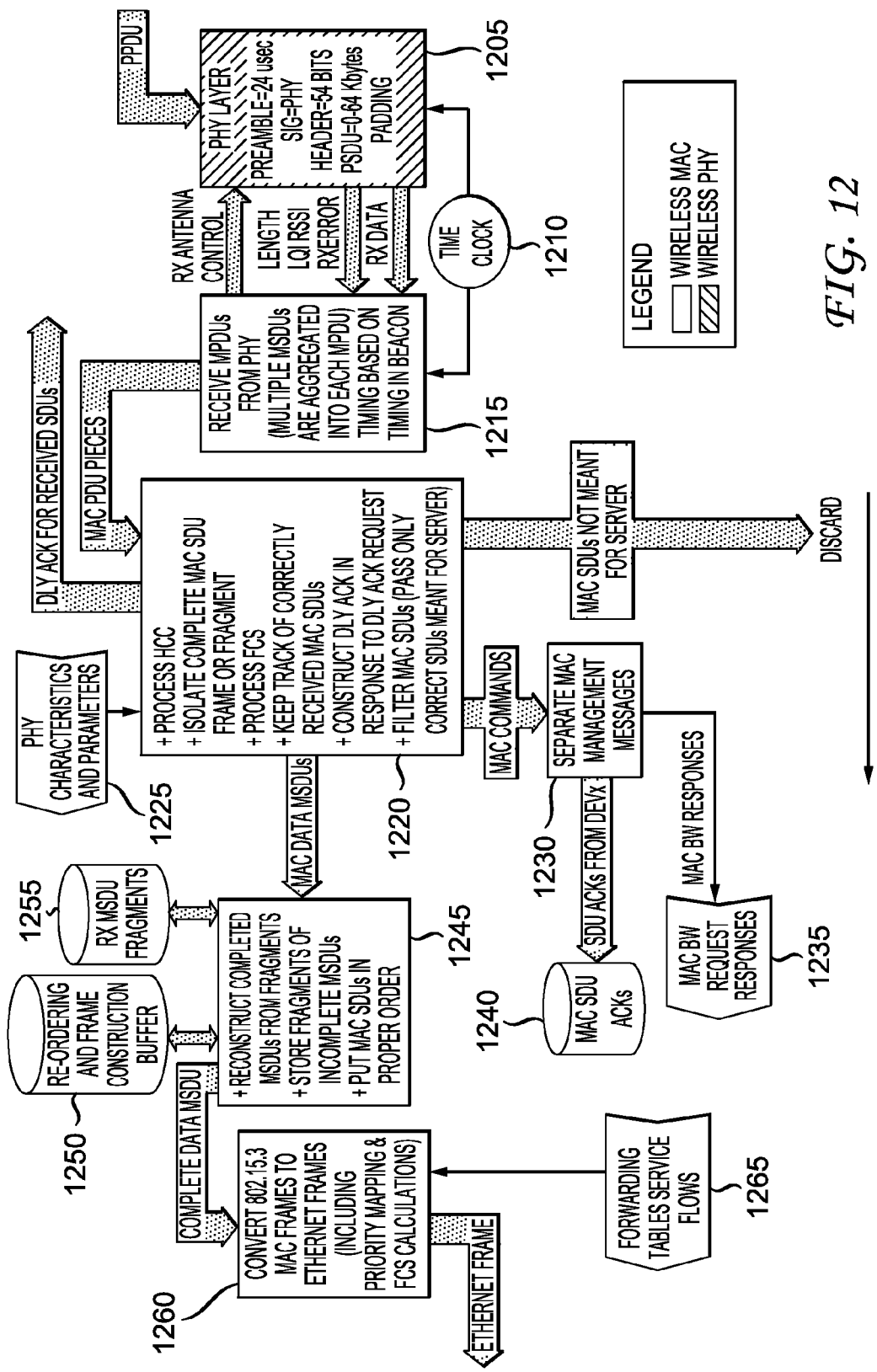
FIG. 12 is a high level receive packet flow diagram for the DEV-x connected to a video client (remote STB).

Exemplary packet flow diagrams for the PNC connected to the master STB are shown in FIGS. 9 and 10. Exemplary packet flow diagrams for a DEV-x (i.e., non-PNC device) connected to a remote STB are shown in FIGS. 11 and 12. As has been described above, the wireless MAC bridge of the exemplary high definition video distribution system acts as a constrained bridge.

Referring now to FIG. 9, the PNC receives Ethernet video data frames on the Ethernet port (mostly video) 905. The PNC determines the length of the superframe and each CTA. It places the frame in the proper transmit queue 910a, 910b, 910c depending on the destination MAC address. The PNC can either learn the MAC address through flooding as described in IEEE 802.1D or the filtering/routing tables can be filled manually. For purposes of reducing clutter on the figure, the present invention is described assuming only one queue per transmit port (destined for each DEV-x/remote STB). If multiple priorities are desired, then there would be multiple queues per transmit port (destined for each DEV-x/remote STB). That is, one queue for each priority group. The Ethernet video data frames are divided into the queues. In the exemplary embodiment the queues are 165 kbytes each and the superframe is between 5 msec and 10 msec long. The video data frames from the queues are forwarded to a software module 915 that converts; the Ethernet video data frames to IEEE 802.15.3b MAC frames including priority mapping, frame check sequence (FCS), fragmentation and header correction code (HCC) calculations. The software module 915 receives forwarding tables and service flows to process the received Ethernet video data frames from data storage unit 920. Software module 915 is in communication with a buffer 925 for storing the transmit MAC service data units (MSDUs). Software module 930 requests the MAC frames from software module 915 in order to construct the superframe. Software module 915 forwards multiple MSDUs to software module 930. Software module 930 receives physical characteristics and parameters from data storage unit 935 and MSDUs acknowledgments (ACKs) from the previous service frame from a buffer 940 in order to construct the superframe. Data storage unit 945 receives MAC bandwidth management commands that are stored as local and remote DEV (STBs) queue lengths from the previous superframe so that the CTA lengths can be varied. This information is forwarded to MAC bandwidth management entity 950, which forwards the CTA lengths to software module 930 in order to further support the construction of the superframe. Software module 930 also receives the MSDUs to be retransmitted from the previous frame from superframe retransmit buffer 955, which stores multiple MSDUs in each remote STB MAC protocol data unit (MPDU) and discards acknowledged MSDUs. The superframe constructed by software module 930 is stored in superframe construction buffer 960. The superframe constructed by software module 930 includes downstream MPDUs and upstream time. Superframe construction buffer 960 forwards the constructed superframes to superframe transmit buffer 965 in the form of multiple MSDUs in each remote STB MPDU. Superframe transmit buffer 965 forwards the superframes it receives from superframe construction buffer to superframe retransmit buffer 955. Superframe transmit buffer 965 forwards the complete MPDU to software module 970. Software module receives a delayed ACK from the remote STBs during the receive interval and timing information from the time clock 975. Software module 970 aggregates multiple MSDUs into each MPDU and forwards them to the physical layer module 980 for transmission. Software module 970 uses the timing based on the timing in the beacon and forwards the transmit data, transmit data rate, transmit length, transmit power level and transmit antenna control to physical layer module 980, which transmits the physical data protocol unit (PPDU) from the PNC to the designated remote STB.

Since FIG. 10 is depicting receive packet flows the description will begin and proceed from the right hand side of the diagram. A PPDU is received at physical layer software module 1005, which also receives input from time clock 1010. Physical layer software module forwards the received data, length, link quality indicator (LQI), received signal strength indicator (RSSI) and PHY receive errors to software module 1015. Software module 1015 breaks the PPDU into MPDUs which are aggregated MSDUs using timing based on the timing beacon and forwards the MPDUs to software module 1020, which performs the HCC calculations, isolates the complete. MSDU frame or fragment, processes the frame check sequence, keeps track of correctly received MSDUs, constructs the delayed ACK in response to the delayed ACK request and filters the MSDUs so that only the correct MSDUs intended for the server are passed on to the server (master STB). Software module 1020 forwards the delayed ACK for the received MSDUs and discards the MSDUs not intended for the server (master STB). Software module 1020 receives physical characteristics and parameter from data storage unit 1025 in order to perform the above described functions. Software module 1020 forwards MAC commands such as delayed ACKS and bandwidth management messages to software module 1030, which separates the MAC commands and forwards the MSDU ACKs to MSDU ACK buffer 1035 and forwards the MAC bandwidth information elements (IEs) to MAC bandwidth management entity 1040. Software module 1020 also forwards MSDUs (mostly TCP ACKs) to software module 1045, which reconstructs completed MSDUs from fragments, stores fragments of incomplete MSDUs and puts MSDUs in the proper order. Software module 1045 is in communication with re-ordering frame construction buffer 1050 and receive MSDU fragment buffer 1055. Software module 1045 forwards the complete MSDUs to software module 1060, where the complete MSDUs are converted to Ethernet frames including frame check sequence and priority mapping. Software module receives forwarding tables and service flow information from data storage unit 1065 and forwards the Ethernet frames to the server (master STB).

FIG. 11 is the high level transmit packet flow for a DEV-x connected to a remote STB (video client). Ethernet frames are received by software module 1105, which filters and classifies incoming frames from the video client. Software module 1105 forwards the Ethernet frames to frame queue 1110. There is only one queue since all traffic should be going to the server (master STB). However, if multiple priorities are desired, there multiples queues are implemented—one queue for each priority group. The data in the queue is forwarded to software module 1115, which converts the Ethernet frames to IEEE 802.15.3 MAC frames including priority mapping, frame check sequence, fragmentation and HCC calculations. Software module 1115 receives forwarding table and service flow information from data storage unit 1120. Software module 1115 is also in communication with transmit MSDU transmit buffer 1125. Software module forwards multiple MSDUs to software module 1130, which constructs upstream MPDU for transmission within the next superframe. Software module 1115 also receives requests from software module 1130. Software module 1130 receives MSDU ACKs from the previous superframe from buffer 1135. Software module 1130 receives physical characteristics and parameters from data storage unit 1140 and receives CTA information from the beacon from data storage unit 1145. Software module 1130 receives MAC bandwidth management commands from software module 1150, which constructs bandwidth management message using local queue length information received from data storage unit 1155 and MAC bandwidth request responses (IEEE 802.15.3 MAC command used in a non-standard way to exchange queue information) from the previous superframe from data storage unit 1160. Software module 1130 receives MSDUs to be retransmitted from the previous superframe from superframe retransmit buffer 1165. There are multiple MSDUs in each MPDU. Superframe retransmit buffer 1165 also discards acknowledged MSDUs. Software module 1130 is in communication with construction buffer 1170, which is a buffer for upstream MPDUs for the next superframe. Construction buffer 1170 forwards the upstream MPDUs to superframe transmit buffer 1175, which forwards the upstream MPDUs to software module 1180. Superframe transmit buffer 1175 also forwards the upstream MPDUs to superframe retransmit buffer 1165. Software module 1180 aggregates multiple MSDUs into each MPDU using timing based on the beacon and passes the MPDUs to the physical layer software module 1185 for transmission. Software module receives time from time clock 1190 and receives delayed ACKs from the server (master STB) during the receive interval. Software module 1180 forwards transmit data, transmit data rate, transmit length, transmit power level and transmit antenna control to physical layer software module 1185.

An approximation of the receive process in the remote DEVs is shown in FIG. 12. The receive process mostly consists of disassembling the superframe and then reconstructing Ethernet Frames, including reassembling fragmented frames. The receive side also checks for errors and prepares a DLY ACK (a type of bulk ACK) for transmission back to the PNC. The DLY ACKs are sent at the beginning of the CTA heading the opposite direction of the CTA within which the packet arrived. This is another deviation from the standard.

FIG. 12 is a high level receive packet flow diagram for the DEV-x connected to a video client (remote STB) so the description will begin and proceed from the right hand side of the diagram. Software module 1205 receives PPDU and forwards the received data, received errors, length, LQI and RSSI to software module 1215. Software module 1205 receives receive antenna control information from software module 1215 and receives timing information from time clock 1210. Software module 1215 receives MPDUs from physical layer software module 1205. Multiple MSDUs are aggregated into each MPDU. Software module 1215 receives timing from time clock 1210. Software module 1215 forwards MPDU pieces to software module 1220, which performs HCC calculations, isolates complete MSDU frames or fragments, processes frame check sequence, keeps track of correctly received MSDUs, constructs a delayed ACK in response to a delayed ACK request and filters MSDUs and forwards only correctly received MSDUs intended for the server (master STB). Software module receives physical characteristics and parameters from data storage unit 1225 and forwards delayed ACKs for the received MSDUs. Software module 1220 discards MSDUs not intended for the video client (remote STB). And forwards MAC commands to software module 1230, which separates MAC management messages and forwards MAC bandwidth responses to data storage unit 1235 and forwards MSDU ACKs from the remote STBs to MSDU buffer 1240. Software module 1220 forwards MSDUs to software module 1245, which reconstructs completed MSDUs from fragments, stores fragments of incomplete MSDUs and puts MSDUs in the proper order. Software module 1245 is in communication with re-ordering and frame construction buffer 1250 and receive MSDU fragment buffer 1255. Software module 1245 forwards complete MSDUs to software module 1260, which converts MAC frames to Ethernet frames including priority. Software module 1260 also receives forwarding table and service flow information from data storage unit 1265.

Figure 13:
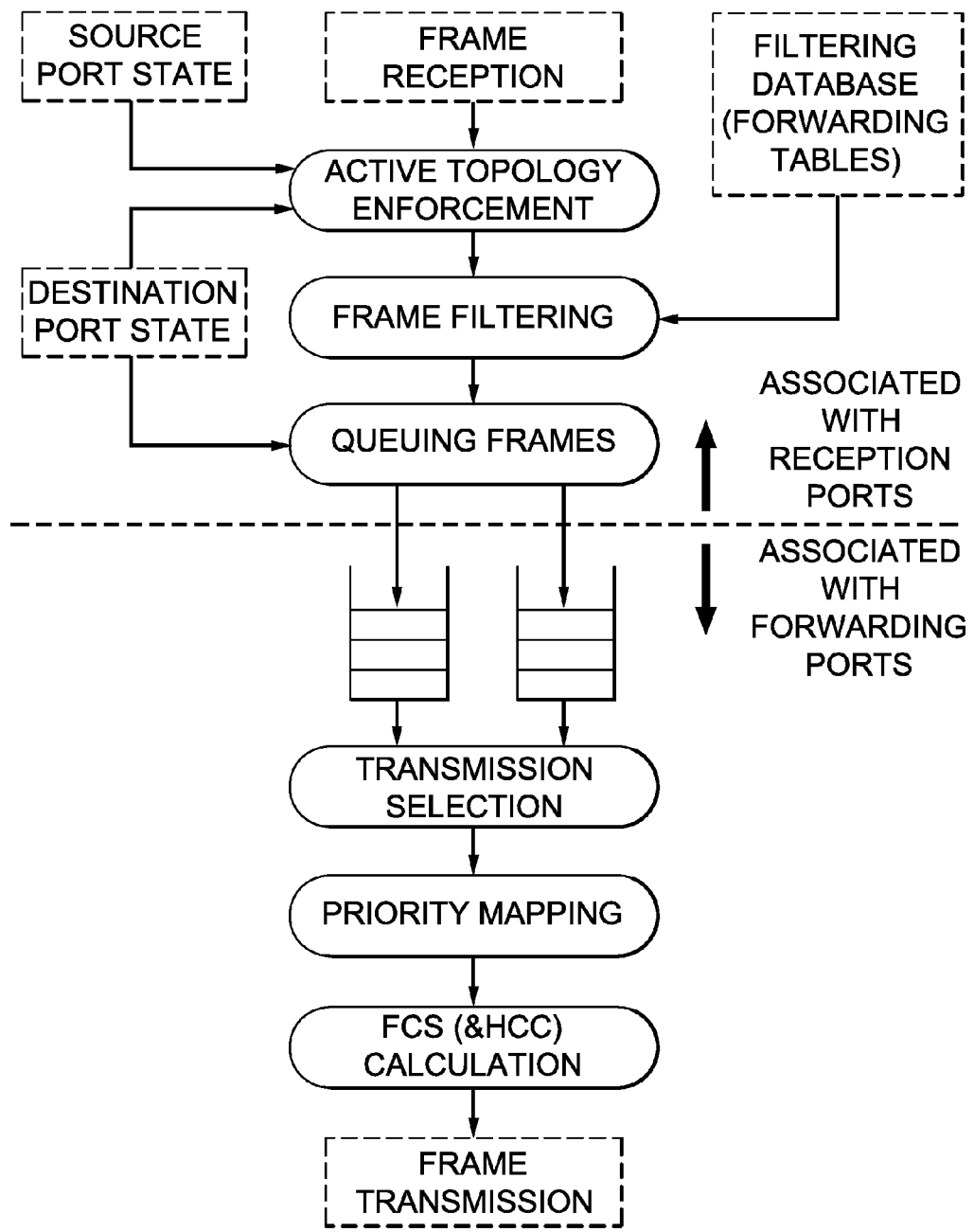
FIG. 13 is a diagram of general MAC switch forwarding functions.
Figure 14:
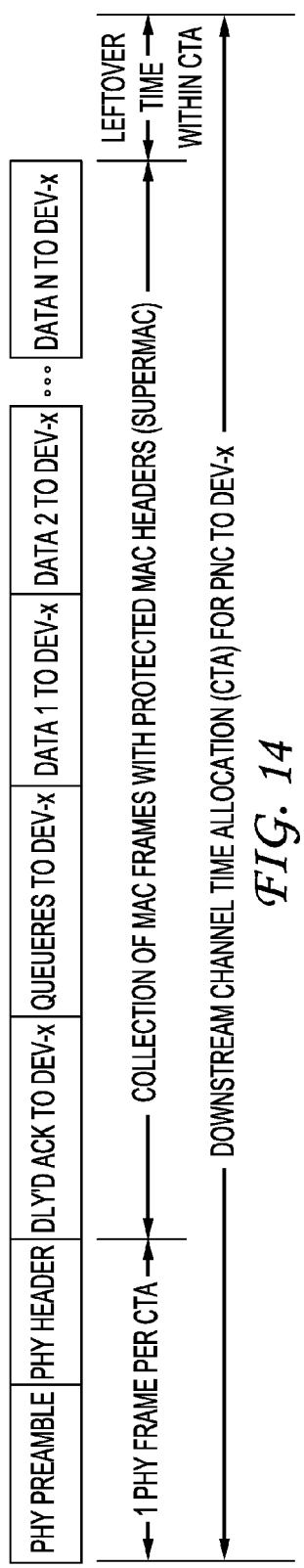
FIG. 14 depicts a single downstream CTA (PNC to DEV-x).
Figure 15:
FIG. 15 depicts SuperMAC (a non-standard aggregation of MAC Frames) and physical frame formatting.

A diagram of general switch forwarding functions as described in IEEE 802.1D is shown in FIG. 13. One transmit queue in FIG. 13 corresponds to the set of transmit queues in FIG. 9. There are multiple queues per transmit port in FIG. 13 because of general priority support. That feature is not explicitly shown in FIGS. 9 and 11. The order of some of the other functions are slightly different between this figure and FIGS. 9 and 11 (e.g., when frames are converted from IEEE 802.3 to IEEE 802.15.3), but the end functionality is the same. The PNC receives Ethernet frames and constructs the Beacon and the frames for transmission to DEV1-DEV3 in CTA1-CTA3 as shown in FIG. 14, which shows one CTA. Once the CTA lengths have been determined, the PNC will construct SuperMac Frames (a non-standard aggregation of IEEE 802.15.3 MAC Frames) as shown in FIG. 15. They are constructed to fill the CTA including fragmentation of the last MAC Frame. This non-standard packing is only an example of the frames sent within CTA1, 2, or 3 and it is not necessary that the MAC PDUs be aggregated into a single PHY packet. The superframe is then forwarded to the PHY Layer for synchronous transmission. The CTAs start precisely at the times advertised in the beacon.

Referring to FIG. 14, the physical preamble and physical header make up one physical frame per CTA. Delayed ACK to a remote STB, queue status information request to remote STB and multiple data packets to a remote STB make up a collection of MAC frames with protected MAC headers. The above concatenated with any leftover time within the CTA make up the downstream CTA for the PNC to a remote STB.

Note that the first and/or last MPDU placed into the CTA may consist of a fragment from the original MAC payload. Since the IEEE 802.15.3 MAC header contains information for fragmentation and reassembly, it should be understood that the methods described herein can include fragmentation and reassembly without further explanation.

Referring now to FIG. 15, for each MAC payload there is a corresponding MAC header. The HCC is calculated and inserted after the MAC header and before the MAC payload. The FCS is calculated and inserted after the MAC payload. This is done for each MAC payload to create a SuperMAC frame. The SuperMAC frame length is part of the physical header, which is inserted ahead of the SuperMAC frame to make a CTA, which is modulated and transmitted over the air. The physical header is transmitted at a slow reliable rate and the SuperMAC portion of the CTA is transmitted at some desirable rate.

Figure 16:
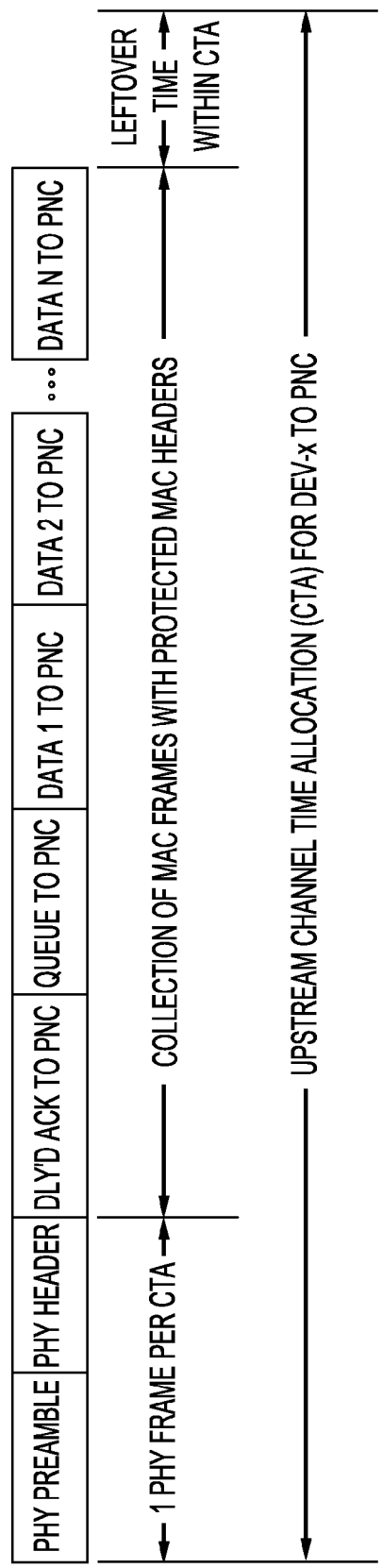
FIG. 16 depicts a single upstream CTA (DEV-x to PNC).

Transmission of frames within CTA 4, 5, & 6 are sent in a similar manner. An example of frames sent in one of those CTAs is shown in FIG. 16, which depicts a single upstream CTA (DEV-x to PNC), a single upstream CTA includes a physical frame and a collection of MAC frames with protected headers and any leftover time within the CTA. Like the downstream CTA depicted in FIG. 14 the physical frame includes the physical preamble and the physical header. The collection of MAC frames includes the delayed ACK to the PNC, the queue status information to the PNC and the data packets to the PNC. Note that this CTA includes a frame which carries queue status information back to the PNC. This queue status information may include the size of the queue (if that is variable), the number of frames in the queue, the average length of the frames, and the frame arrival rate at the input of the queue.

The present invention uses a fixed-length 5 msec or 10 msec superframe. For the case where the length of the superframe and CTAs are fixed, Table 1 shows some reasonable values. Table 2 shows the approximate number of packets expected within each CTA under some specific assumptions. However, as has been stated, the present invention involves adapting the length of CTAs and possibly even the superframe length to minimize queue overflows and maximize the use of the time and therefore achieve a high efficiency.

TABLE 1

| | | SuperMAC Frame Sizes and Recommended CTA Lengths | | | | | | | |
|---|---|---|---|---|---|---|---|---|---|
| Superframe | | 20 MHz, QPSK, ½ rate | Assumes 40 MHz, 16QAM, ⅚ rate coding | | | Assumes 40 MHz, 16QAM, ⅚ rate coding | | | |
| Length | | Beacon | CTA-1 | CTA-2 | CTA-3 | CTA-4 | CTA-5 | CTA-6 | Leftover+ |
| 5 msec | Frame Lengths* | 100 usec | 1.3 msec | 1.3 msec | 1.3 msec | 96 usec | 96 usec | 96 usec | |
| | Recommended | 116 usec | 1.4 msec | 1.4 msec | 1.4 msec | 228 usec | 228 usec | 228 usec | 0 usec |

TABLE 1-continued

SuperMAC Frame Sizes and Recommended CTA Lengths

| Superframe Length | | 20 MHz, QPSK, ½ rate | Assumes 40 MHz, 16QAM, ⅝ rate coding | | | Assumes 40 MHz, 16QAM, ⅝ rate coding | | | Leftover+ |
|---|---|---|---|---|---|---|---|---|---|
| | | Beacon | CTA-1 | CTA-2 | CTA-3 | CTA-4 | CTA-5 | CTA-6 | |
| 10 msec | Allocated Time+# Frame Lengths* Recommended Allocated Time+# | 100 usec 116 usec | 2.44 msec 3.0 msec | 2.44 msec 3.0 msec | 2.44 msec 3.0 msec | 136 usec 240 usec | 136 usec 240 usec | 136 usec 240 usec | . . . 160 usec |

*For CTA-1,2,3 based on 1404-byte payload MAC Frames each with 1300 bytes of video data.
For CTA-4,5,6 based on 40-byte MAC payload for TCP ACKs
+Each Frame must be followed by a 16 usec SIFS.
CTA-4,5,6 sized to accommodate at least 1 full size frame to avoid fragmentation

TABLE 2

Approximate Number of Data Frames per CTA

| Superframe Length | CTA-1 Video Frames* | CTA-2 Video Frames | CTA-3 Video Frames | CTA-4 TCP ACKs+ | CTA-5 TCP ACKs | CTA-6 TCP ACKs |
|---|---|---|---|---|---|---|
| 5 msec. | 10# | 10 | 10 | 10 | 10 | 10 |
| 10 msec | 19# | 19 | 19 | 19 | 19 | 19 |

*For CTA-1,2,3 based on 1404-byte payload MAC Frames each with 1300 bytes of video data.
+For CTA-4,5,6 based on 40-byte MAC payload for TCP ACKs
Number of Frames per CTA chosen to meet bit rate requirements (i.e., ~20 Mbps per for video data)

In the present invention, the PNC determines the length of CTAs and possibly the superframe in an adaptive way. To do this, the PNC needs information on the traffic that needs to be transmitted. The PNC obviously can get to the information on the three transmit queues embedded in it. To get information on the transmit queues in the remote DEVs, the remote DEVs send queue status information (in a new command) within their CTA once every Superframe. The operation flow follows the flow-chart in FIG. 17. The will receive information regarding the status of all transmit queues (one for each CTA). The status information includes a minimum set of such things as number of packets in the queue, average length of packets in the queue and packet queue arrival rate and size of queue if that is variable.

Figure 17:
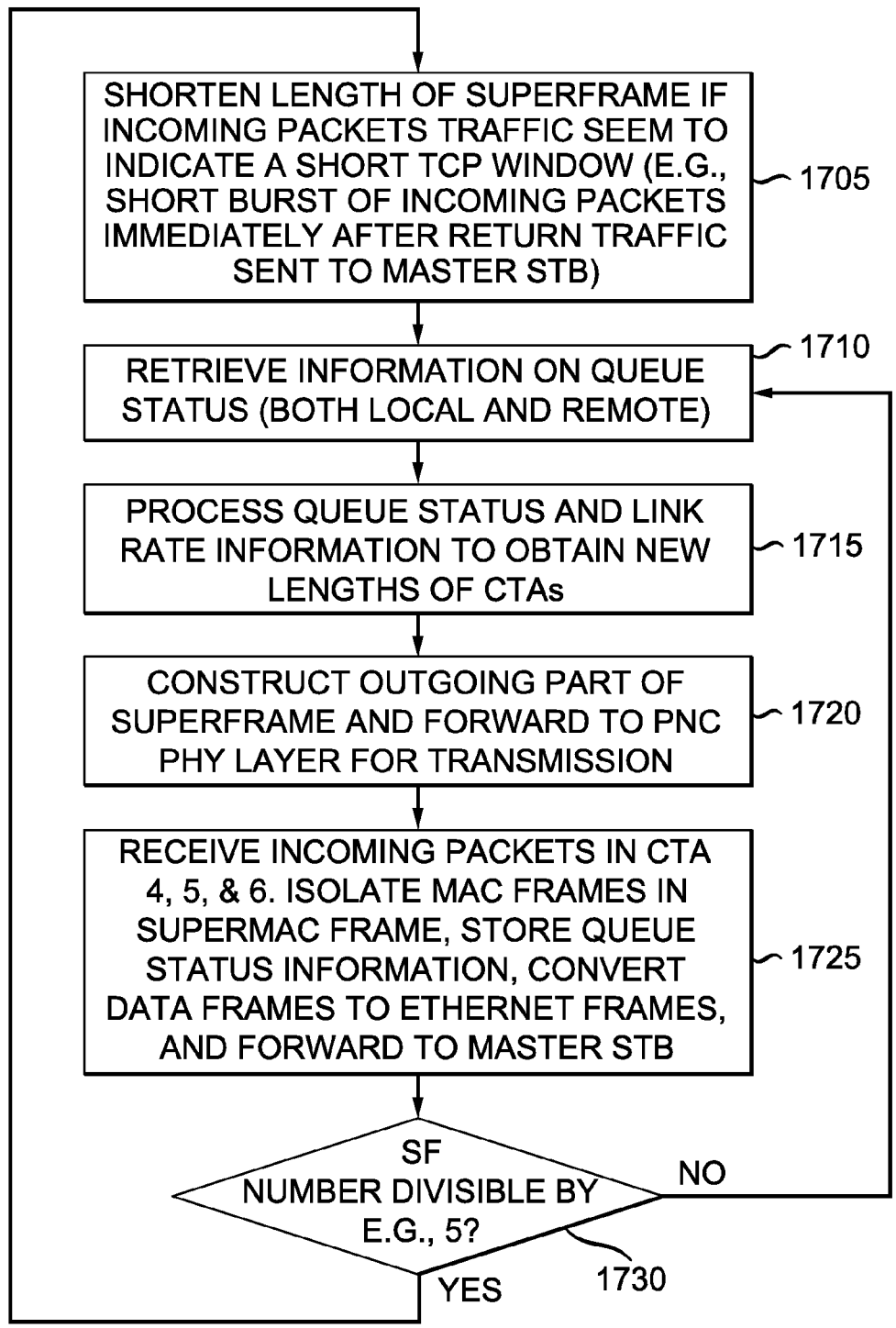
FIG. 17 is a flowchart of the processing in a PNC in accordance with the principles of the present invention.

A high-level flow chart for adaptation in the PNC, which is associated with the Master STB in the exemplary embodiment, is shown in FIG. 17. The PNC shortens the length of the superframe if incoming traffic indicates a short TCP window at 1705. This is true if there is a short burst of incoming traffic after return traffic is sent to the master STB. The PNC retrieves information on queue statuses (local and remote) at 1710. The PNC processes the queue status information and link rate information to calculate new CTA lengths at 1715 and constructs the outgoing part of the superframe and forwards it to the physical layer for transmission. Incoming packets (CTA 4-6) are received and MAC frames are isolated, queue status information is stored, and MAC data frames are converted to Ethernet frames and forwarded to the master STB at 1725. A test is made at 1730 to determine if the superframe is divisible by a predetermined number, for example 5. If it is divisible by the predetermined number then the process proceeds to 1705 (i.e., superframe length is adjusted once every 5 superframes). If the superframe is not divisible by the predetermined number then the process proceeds to 1710.

Figure 18:
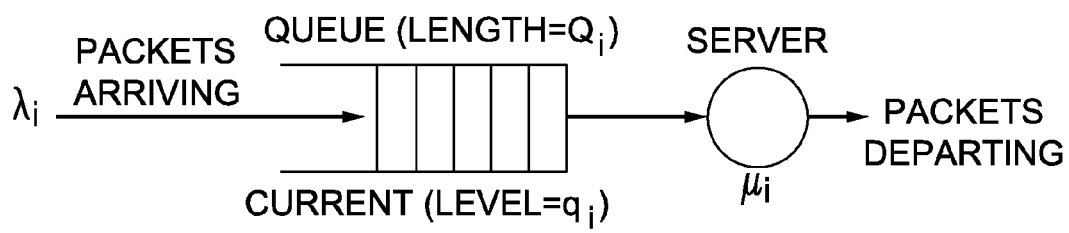
FIG. 18 depicts a single queue model in accordance with the principles of the present invention.
Figure 19:
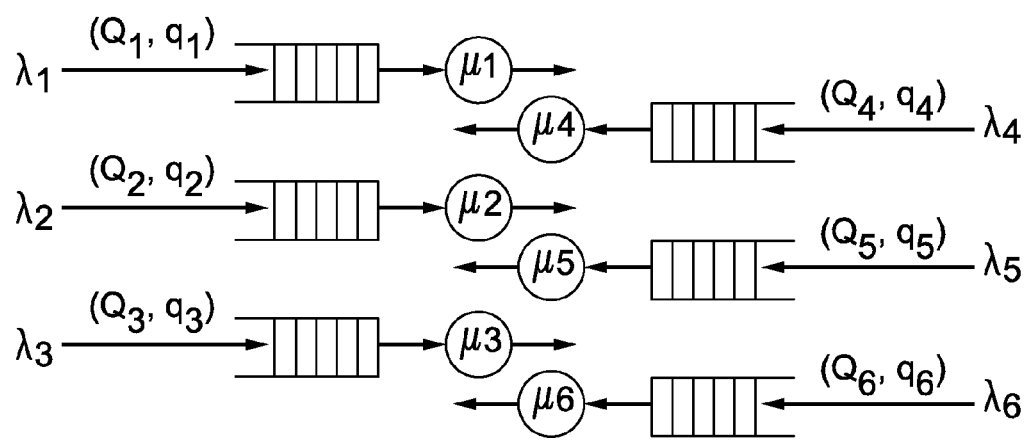
FIG. 19 depicts multiple wireless transmit queues in accordance with the principles of the present invention.

FIG. 18 depicts a single queue model in accordance with the principles of the present invention. FIG. 19 depicts multiple wireless queues in accordance with the principles of the present invention.

The packet service rate for a transmit queue is proportional to the length of the corresponding CIA. CTAs are restricted in that they must add up to the length of a superframe. In the present invention, the master STB allocates more time to queues that are fuller and/or have a higher input arrival rate. In the present invention, the mean queue level is estimated using prior art techniques. The mean queue level is combined into an overall metric such as sum, mean squared error, etc. Adaptive processing techniques are employed to cause the system to allocate CTA time in such a way that the system operates around the minimum of the metric used, which is optimal in some sense. The system has the advantage that it can adapt quickly to allocate CTAs in such a way as to maximize throughput for any given steady state traffic pattern, but can then quickly adapt to a new pattern within several superframes. The present invention also has the advantage that it finds these optimal locations based on traffic patterns. It is assumed that there is no control over the traffic patterns and there is not enough information to "reserve" a fixed amount of bandwidth for each device.

Even though the description above has focused on a wireless bridging system with one master and three client devices suitable for a high definition video distribution application, it should be clear to those trained in the art that the methods can be extended to a general wireless TDMA MAC and even to wired TDMA MACs running on common media (e.g. powerline).

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for wirelessly re-distributing multi-media streams, said method comprising:
   receiving multi-media streams at a master bridging device from a source;
   adaptively determining, by the master bridging device, an amount of time within a channel time allocation for at least one transmit queue in response to status information for the at least one transmit queue and transmission channel conditions to optimize traffic flow, said amount of time is determined adaptively regardless of fixed time slots;
   constructing, by the master bridging device, a media access control superframe including media access control frames from said multi-media streams, said media access control frames being inserted into respective ones of the at least one transmit queue for downstream transmission at the determined channel time allocation; and
   wirelessly transmitting downstream, from the master bridging device, to a remote device the media access control frames within the media access control superframe from the at least one transmit queue at the determined channel time allocation to effect re-distribution of said multi-media streams to the remote device, wherein a length of said superframe is adjustable based on a length of said at least one transmit queue and said channel conditions.

2. The method according to claim 1, further comprising:
   transmitting a beacon signal prior to said channel time allocation; and
   re-distributing said multi-media streams to remote receivers of said multi-media streams.

3. The method according to claim 2, further comprising receiving acknowledgements that said re-distributed multi-media stream has been received by said remote device.

4. The method according to claim 1, wherein said multi-media stream from said source is packaged as Ethernet frames and further comprising:
   filtering and classifying said Ethernet multi-media frames into transmit queues; and
   constructing said media access control layer frames from said Ethernet multi-media frames.

5. The method according to claim 4, further comprising allocating more channel time to said transmit queues that are one of fuller and have a higher input arrival rate and a combination of fuller queues and higher input arrival rate.

6. The method according to claim 1, wherein said determining act is based on information received regarding status of said transmit queues.

7. The method according to claim 6, wherein said information regarding status of said transmit queues includes a number of packets in each transmit queue, an average length of packets in each transmit queue and an estimated input packet arrival rate.

8. The method according to claim 1, wherein said amount of time within the channel time allocation is adaptively determined based on queue status information received from said remote device.

9. The method according to claim 1, wherein said amount of time within the channel time allocation is adaptively determined based on minimizing a metric.

10. The method according to claim 1, wherein said amount of time within the channel time allocation is adaptively determined based on traffic characteristics available.

11. The method according to claim 1, wherein said amount of time within the channel time allocation is adaptively determined based on minimizing an expected number of packets in each transmit queue.

12. The method according to claim 1, wherein said amount of time within the channel time allocation is adaptively determined based on minimizing a probability that any of said transmit queues overflow.

13. An apparatus for wirelessly re-distributing multi-media streams, comprising, at a master bridging device:
   means for receiving multi-media streams from a source;
   means for adaptively determining an amount of time within a channel time allocation for at least one transmit queue in response to status information for the at least one transmit queue and transmission channel conditions to optimize traffic flow, said amount of time is determined adaptively regardless of fixed time slots;
   means for constructing a media access control superframe including media access control frames from said multi-media streams, said media access control frames being inserted into respective ones of the at least one transmit queue for downstream transmission at the determined channel time allocation; and
   means for wireless transmitting said downstream to a remote device the media access control frames within the media access control superframes from the at least one transmit queue at the determined channel time allocation to effect re-distribution of said multi-media streams to the remote device, wherein a length of said superframe is adjustable based on a length of said at least one transmit queue and said channel conditions.

14. The apparatus according to claim 13, further comprising:
   means for transmitting a beacon signal prior to said channel time allocation; and
   means for re-distributing said multi-media streams to remote receivers of said multi-media streams.

15. The apparatus according to claim 14, further comprising means for receiving acknowledgements that said re-distributed multi-media stream has been received by said remote device.

16. The apparatus according to claim 13, wherein said multi-media stream from said source is packaged as Ethernet frames and further comprising:
   means for filtering and classifying said Ethernet multi-media frames into transmit queues; and
   means for constructing said media access control layer frames from said Ethernet multi-media frames.

17. The apparatus according to claim 16, further comprising allocating more channel time to said transmit queues that are one of fuller and have a higher input arrival rate and a combination of fuller queues and higher input arrival rate.

18. The apparatus according to claim 13, wherein said means for adaptively determining determines the amount of time within the channel time allocation based on information received regarding status of said transmit queues.

19. The apparatus according to claim 18, wherein said information regarding status of said transmit queues includes a number of packets in each transmit queue, an average length of packets in each transmit queue and an estimated input packet arrival rate.

20. The apparatus according to claim 13, wherein said amount of time within the channel time allocation is adaptively determined based on one of queue status information received from said remote device, minimizing a metric, traffic characteristics available, minimizing an expected number of packets in each transmit queue, or minimizing a probability that any of said transmit queues overflow.

21. The apparatus according to claim 13, wherein said apparatus is a wireless media access control bridge.

22. An apparatus for wirelessly re-distributing multi-media streams, comprising:
a network interface configured to receive multi-media streams from a source;
a processor configured to adaptively determine an amount of time within a channel time allocation for at least one transmit queue in response to status information for the at least one transmit queue and transmission channel conditions to optimize traffic flow, said amount of time is determined adaptively regardless of fixed time slots; and the processor constructs a media access control superframe including media access control frames from said multi-media streams, said media access control frames being inserted into respective ones of the at least one transmit queue for downstream transmission at the determined channel time allocation; and
a wireless radio configured to wirelessly transmits said downstream to a remote device the media access control frames within the media access control superframes from the at least one transmit queue at the determined channel time allocation to effect re-distribution of said multi-media streams to the remote device, wherein a length of said superframe is adjustable based on a length of said at least one transmit queue and said channel conditions.

23. The apparatus according to claim 22, wherein the wireless radio transmits a beacon signal prior to said channel time allocation and re-distributes said multi-media streams to remote receivers of said multi-media streams.

24. The apparatus according to claim 23, wherein the wireless radio receives acknowledgements that said re-distributed multi-media stream has been received by said remote device.

25. The apparatus according to claim 22, wherein said multi-media stream from said source is packaged as Ethernet frames and the processor further configured to:
filter and classify said Ethernet multi-media frames into transmit queues; and construct said media access control layer frames from said Ethernet multi-media frames.

26. The apparatus according to claim 25, wherein the processor allocates more channel time to said transmit queues that are one of fuller and have a higher input arrival rate and a combination of fuller queues and higher input arrival rate.

27. The apparatus according to claim 22, wherein the processor adaptively determines the amount of time within the channel time allocation based on information received regarding status of said transmit queues.

28. The apparatus according to claim 27, wherein said information regarding status of said transmit queues includes a number of packets in each transmit queue, an average length of packets in each transmit queue and an estimated input packet arrival rate.

29. The apparatus according to claim 22, wherein said amount of time within the channel time allocation is adaptively determined based on one of queue status information received from said remote device, minimizing a metric, traffic characteristics available, minimizing an expected number of packets in each transmit queue, and minimizing a probability that any of said transmit queues overflow.

30. The apparatus according to claim 22, wherein said apparatus is a wireless media access control bridge.

\* \* \* \* \*